(12) United States Patent
Saito

(10) Patent No.: US 9,513,701 B2
(45) Date of Patent: Dec. 6, 2016

(54) INFORMATION PROCESSING APPARATUS, INFORMATION PROCESSING METHOD, AND COMPUTER-READABLE MEDIUM

(71) Applicant: FUJI XEROX CO., LTD., Minato-ku, Tokyo (JP)

(72) Inventor: Tomoaki Saito, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 104 days.

(21) Appl. No.: 14/246,583

(22) Filed: Apr. 7, 2014

(65) Prior Publication Data

US 2015/0049014 A1 Feb. 19, 2015

(30) Foreign Application Priority Data

Aug. 15, 2013 (JP) ................. 2013-168760

(51) Int. Cl.
G09G 5/00 (2006.01)
G06F 3/01 (2006.01)
G06K 9/00 (2006.01)
G06F 21/84 (2013.01)

(52) U.S. Cl.
CPC .............. *G06F 3/013* (2013.01); *G06F 21/84* (2013.01); *G06K 9/00228* (2013.01); *G09G 5/00* (2013.01); *G09G 2354/00* (2013.01); *G09G 2358/00* (2013.01)

(58) Field of Classification Search
CPC ........ G06F 3/013; G06F 21/84; G06F 21/32; G06K 9/00228; G09G 5/003; G09G 5/37
USPC ......................................... 345/156
See application file for complete search history.

(56) References Cited

U.S. PATENT DOCUMENTS 8,922,480 B1 * 12/2014 Freed et al. ................. 345/156

FOREIGN PATENT DOCUMENTS

| JP | 2006-011765 A | 1/2006 |
| JP | 2008-047063 A | 2/2008 |
| JP | 2010-128778 A | 6/2010 |

* cited by examiner

*Primary Examiner* — Gustavo Polo
(74) *Attorney, Agent, or Firm* — Sughrue Mion, PLLC

(57) ABSTRACT

An information processing apparatus includes a line-of-sight detection unit, a display determination unit, and a first display switching unit. The line-of-sight detection unit detects a line of sight of an operator toward a display apparatus. The display determination unit determines whether or not secret information which is information to be concealed from a person other than the operator is displayed on the display apparatus. The first display switching unit switches information displayed on the display apparatus to another image on the basis of the determination result obtained by the display determination unit when the line-of-sight detection unit does not detect the line of sight.

18 Claims, 9 Drawing Sheets

| OBJECT ID | SECRET-INFORMATION ATTRIBUTE |
|---|---|
| 1 | T |
| 2 | F |
| ⋮ | ⋮ |

```
<User Interface>
    <canvas id="1" secret="true"></canvas>
    <canvas id="2"></canvas>
    <canvas id="3"></canvas>
    <canvas id="4"></canvas>
</User Interface>
```

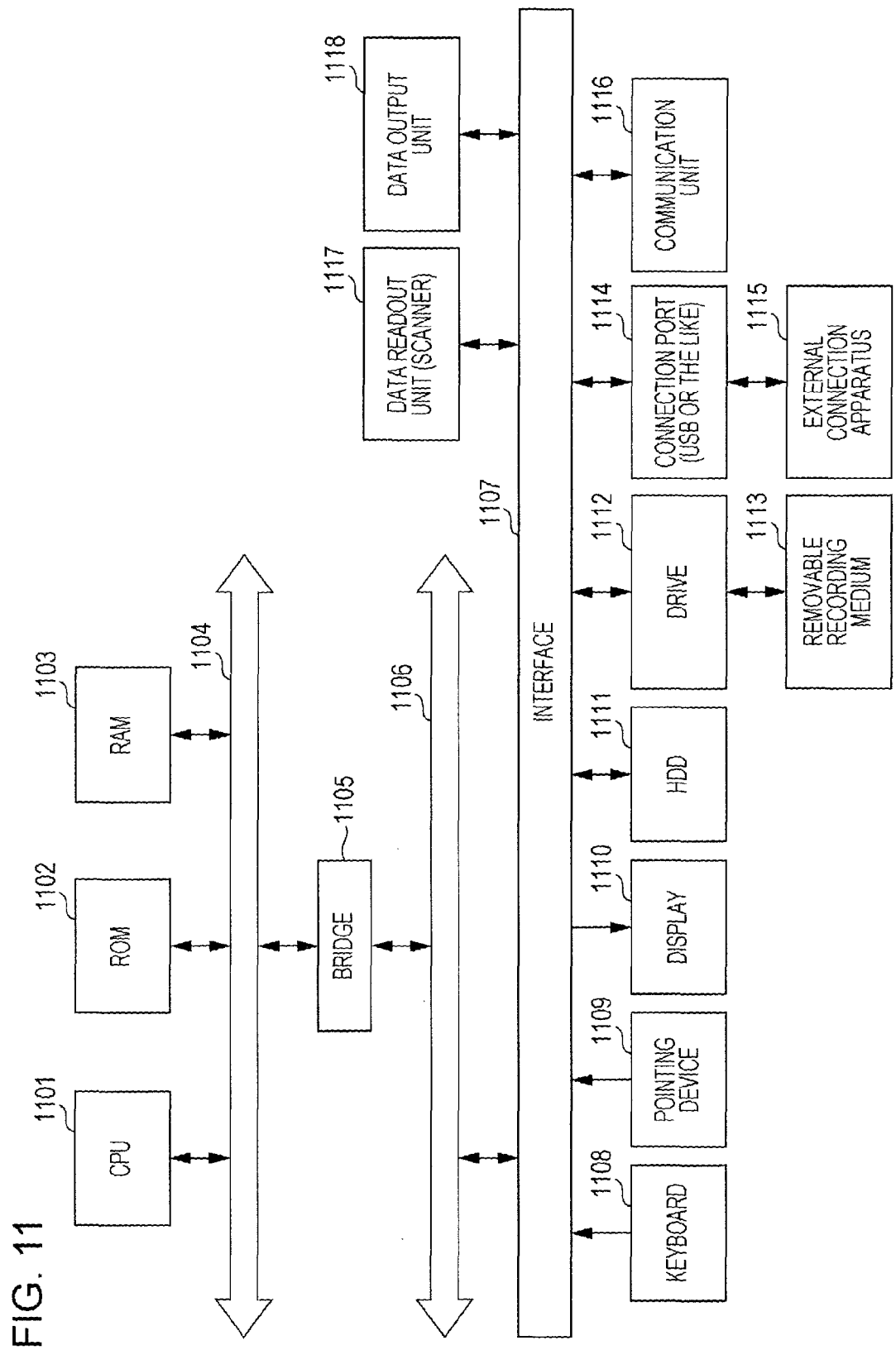

INFORMATION PROCESSING APPARATUS, INFORMATION PROCESSING METHOD, AND COMPUTER-READABLE MEDIUM

CROSS-REFERENCE TO RELATED APPLICATIONS

This application is based on and claims priority under 35 USC 119 from Japanese Patent Application No. 2013-168760 filed Aug. 15, 2013.

BACKGROUND

Technical Field

The present invention relates to an information processing apparatus, an information processing method, and a computer-readable medium.

SUMMARY

The gist of the present invention is present in the following aspect of the invention. According to an aspect of the invention, there is provided an information processing apparatus including a line-of-sight detection unit, a display determination unit, and a first display switching unit. The line-of-sight detection unit detects a line of sight of an operator toward a display apparatus. The display determination unit determines whether or not secret information which is information to be concealed from a person other than the operator is displayed on the display apparatus. The first display switching unit switches information displayed on the display apparatus to another image on the basis of the determination result obtained by the display determination unit when the line-of-sight detection unit does not detect the line of sight.

BRIEF DESCRIPTION OF THE DRAWINGS

Exemplary embodiment of the present invention will be described in detail based on the following figures, wherein:

FIG. 11 is a block diagram illustrating an exemplary hardware configuration of a computer which achieves an exemplary embodiment.

DETAILED DESCRIPTION

An exemplary embodiment which is desirable for achieving the present invention will be described below on the basis of the drawings.

Figure 1:
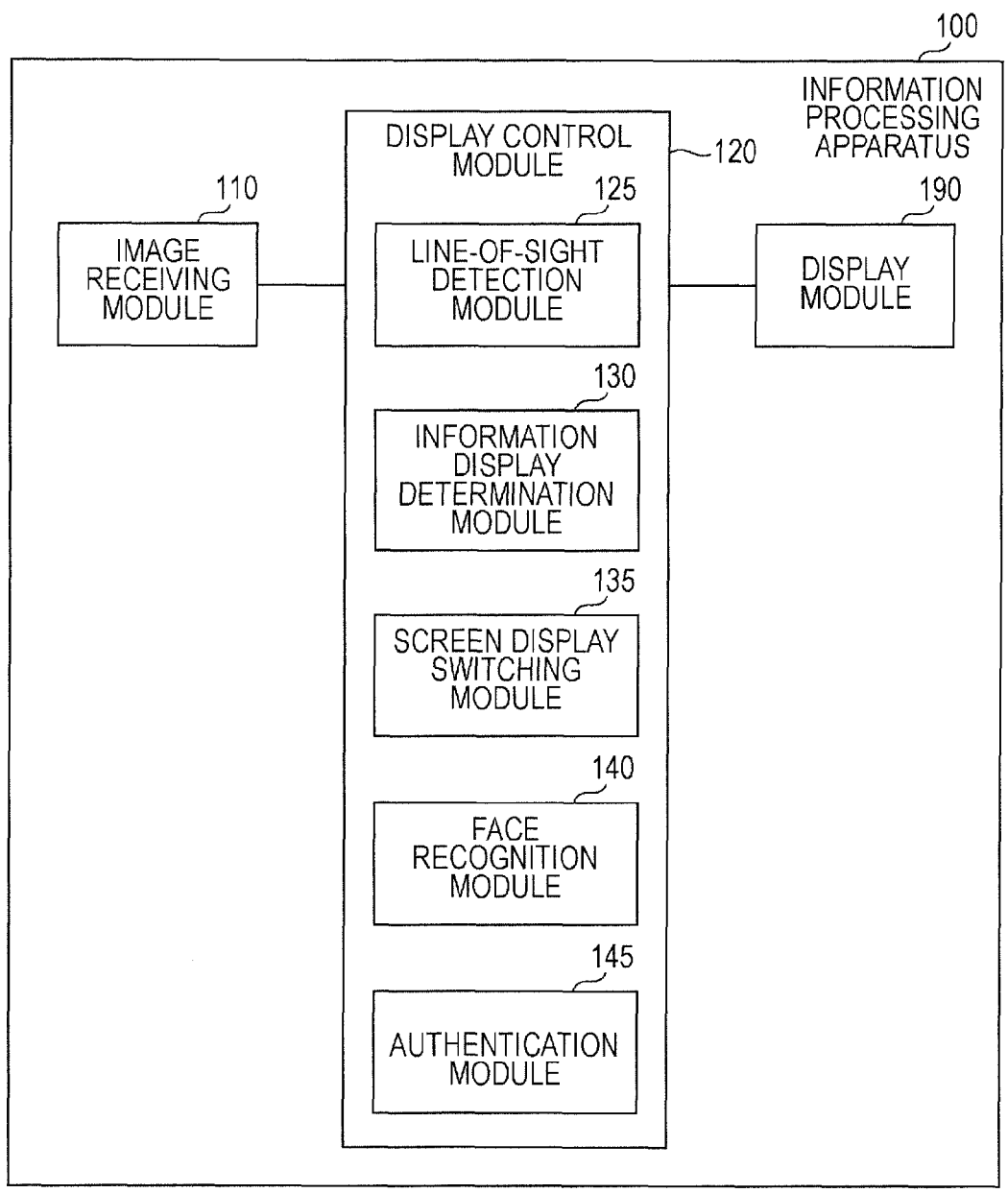
FIG. 1 is a schematic module configuration diagram illustrating an exemplary configuration of an exemplary embodiment.

FIG. 1 is a schematic module configuration diagram illustrating an exemplary configuration of the exemplary embodiment.

In general, a module refers to a component, such as software that is logically separable (a computer program) or hardware. Thus, a module in the exemplary embodiment refers to not only a module in terms of a computer program but also a module in terms of a hardware configuration. Consequently, the description for the exemplary embodiment serves as the description of a system, a method, and a computer program which cause the hardware configuration to function as a module (a program that causes a computer to execute procedures, a program that causes a computer to function as units, or a program that causes a computer to implement functions). For convenience of explanation, the terms "to store something" and "to cause something to store something", and equivalent terms are used. These terms mean that a storage apparatus stores something or that a storage apparatus is controlled so as to store something, when computer programs are used in the exemplary embodiment. One module may correspond to one function. However, in the implementation, one module may constitute one program, or multiple modules may constitute one program. Alternatively, multiple programs may constitute one module. Additionally, multiple modules may be executed by one computer, or one module may be executed by multiple computers in a distributed or parallel processing environment. One module may include another module. Hereinafter, the term "connect" refers to logical connection, such as transmission/reception of data, an instruction, or reference relationship between pieces of data, as well as physical connection. The term "predetermined" refers to a state in which determination has been made before a target process. This term also includes a meaning in which determination has been made in accordance with the situation or the state at that time or before that time, not only before processes according to the exemplary embodiment start, but also before the target process starts even after the processes according to the exemplary embodiment have started. When multiple "predetermined values" are present, these may be different from each other, or two or more of the values (including all values, of course) may be the same. A description having a meaning of "when A is satisfied, B is performed" is used as a meaning in which whether or not A is satisfied is determined and, when it is determined that A is satisfied, B is performed. However, this term does not include a case where the determination of whether or not A is satisfied is unnecessary.

A system or an apparatus refers to one in which multiple computers, pieces of hardware, devices, and the like are connected to each other by using a communication unit such as a network which includes one-to-one communication connection, and also refers to one which is implemented by using a computer, a piece of hardware, a device, or the like. The terms "apparatus" and "system" are used as terms that are equivalent to each other. As a matter of course, the term "system" does not include what is nothing more than a social "mechanism" (social system) which is constituted by man-made agreements.

In each of the processes corresponding to modules, or in each of the processes included in a module, target information is read out from a storage apparatus. After the process is performed, the processing result is written in a storage apparatus. Accordingly, no description about the readout from the storage apparatus before the process and the writing into the storage apparatus after the process may be made. Examples of the storage apparatus may include a hard disk, a random access memory (RAM), an external storage medium, a storage apparatus via a communication line, and a register in a central processing unit (CPU).

An information processing apparatus 100 according to an exemplary embodiment, which is an apparatus for using equipment including a display apparatus such as a liquid-crystal display, includes an image receiving module 110, a display control module 120, and a display module 190 as illustrated in the example in FIG. 1. Examples of such equipment include a copier, a facsimile, a scanner, a printer, a multi-function device (image processing apparatus which includes two or more functions, such as a scanner, a printer, a copier, and a facsimile), an automated teller machine (ATM), and cellular phones including a smart phone. The information processing apparatus 100 may be included in such equipment.

The image receiving module 110 is connected to the display control module 120. The image receiving module 110 receives an image obtained by photographing eyes, a face, or the like of an operator. In particular, an image obtained by photographing a face is referred to as a face image. An operator herein is an operator who operates equipment including the information processing apparatus 100. A camera for photographing a face may be installed in a place where the operator face may be photographed. For example, the camera may be installed near the display apparatus.

The display control module 120 is connected to the image receiving module 110 and the display module 190. The display control module 120 includes a line-of-sight detection module 125, an information display determination module 130, a screen display switching module 135, a face recognition module 140, and an authentication module 145. The display control module 120 exerts control, for example, so as to switch the display of a display apparatus depending on whether or not the line of sight of an operator is detected.

The line-of-sight detection module 125 detects the line of sight of an operator directed toward the display apparatus. The line-of-sight detection module 125 may use a line-of-sight detection method of the related art. A sensor for the line-of-sight detection module 125 may be installed in a place where the line of sight of an operator may be detected. For example, the sensor may be installed near the display apparatus. The line-of-sight detection module 125 may be included in the image receiving module 110. For example, the image receiving module 110 may receive an image of the pupil or corneal reflex of an operator, and the line-of-sight detection module 125 may detect the line of sight of the operator from the image.

Typically, the operator watches the display apparatus such as a liquid-crystal display in order to operate the equipment. That is, in this case, the line of sight is directed toward the display apparatus. The line of sight which is not directed toward the display apparatus (state in which the line-of-sight detection module 125 does not detect the line of sight of the operator directed toward the display apparatus) indicates that the operator does not operate the equipment, and it is not necessary to display information on the display apparatus. Conversely, it is not desirable to display information on the display apparatus from the viewpoint of security. In particular, when secret information which is information to be concealed is displayed on the display apparatus, such information is not to be viewed by a person other than the operator.

For example, in the case where the equipment is a multi-function device or the like, the operator may take his eyes off the screen, for example, when the operator operates a part of the multi-function device other than the screen, such as a document plate, a document feeder, a paper feed tray, or an ejection tray, when the operator looks away, or when the operator temporarily leaves the multi-function device.

When the line-of-sight detection module 125 does not detect the line of sight, the screen display switching module 135 switches the information displayed on the display apparatus to another image (first display switching process). That is, the screen display switching module 135 switches the display to one which causes no problems even when a person other than the operator watches the display.

After the first display switching process performs the display switching process, when the line-of-sight detection module 125 detects the line of sight, the screen display switching module 135 switches the display to one before the first display switching process is performed (second display switching process). For example, this is a case in which the line of sight is diverted, and then returned back. Therefore, the original display is returned back.

The information display determination module 130 determines whether or not secret information which is information to be concealed from a person other than the operator is being displayed on the display apparatus. The secret information is so-called confidential information. Examples of the secret information include a user ID, a password, and a management record of the equipment. Examples of the display screen include a user login screen, an operation screen during user authentication, a display screen displaying destination information of a facsimile, an electric mail, or the like, and a display screen for a confidential document. The determination as to whether or not the secret information is being displayed may be performed by determining whether or not predetermined secret information as described above is being displayed, or whether or not a predetermined display screen as described above is being displayed.

The screen display switching module 135 performs the display switching process on the basis of the determination result obtained by the information display determination module 130. The term "on the basis of the determination result" means that the first display switching process is performed when the secret information is included.

In the first display switching process performed by the screen display switching module 135, an area in which the information display determination module 130 determines that the secret information is being displayed may be switched to another image. For example, only an area in which a user ID and a password are displayed is switched to another image. As a matter of course, the above-described process for switching to another image includes not only switching of part of an area but also switching of the entire display screen.

The authentication module 145 authenticates the operator (first authentication process) in accordance with an operation of the operator. An example of an operation performed by the operator is that the operator operates a keyboard (including a numeric keypad), a mouse, a touch panel, or the like so as to input a user ID and a password. The authentication indicates that whether or not the user ID and the password which are input by the operator match those stored in advance for a person who may use the equipment is determined. In the first authentication process, the operation performed by the operator in this step is stored.

After the first display switching process performed by the screen display switching module 135 performs the display switching process, when the line-of-sight detection module 125 detects the line of sight, the authentication module 145 authenticates the operator depending on whether or not an operation performed by the operator matches the operation which has been performed by the operator when the authentication is performed in the first authentication process (second authentication process). When the line of sight is diverted and then returned back, whether or not the operators before and after the diversion are the same is determined. The authentication here is performed, for example, by determining whether or not the user ID and the password which have been input in the first authentication process match the user ID and the password which have been input this time. The exemplary operation performed by the operator, which is input of a user ID and a password, is described. The exemplary operation may be input of either of a user ID and a password, or may be another operation (such as input of a countersign or the like).

In the second display switching process performed by the screen display switching module 135, when the operator is authenticated in the second authentication process performed by the authentication module 145, the display is switched to one before the first display switching process performed by the screen display switching module 135 performs the display switching process. The display state before the line of sight is diverted is returned back.

The image receiving module 110 receives a face image (first face image) of the operator before the first display switching process is performed by the screen display switching module 135. After the first display switching process performed by the screen display switching module 135 is used to switch the display, when the line-of-sight detection module 125 detects the line of sight, the image receiving module 110 receives a face image (second face image) obtained by photographing the operator face.

The face recognition module 140 determines whether or not the first face image matches the second face image. For example, if the difference between the first face image and the second face image is equal to or less than a predetermined value, the face recognition module 140 may determine that the two face images match each other. Alternatively, feature extraction is performed on the first face image and the second face image. If the distance between the two images in the feature space is equal to or less than a predetermined value, the face recognition module 140 may determine that the two face images match each other. The face recognition module 140 may perform face recognition on the first face image and the second face image so as to determine whether or not the two face images are of the same person.

If the face recognition module 140 determines that the two face images match each other, the second display switching process performed by the screen display switching module 135 switches the display to one before the first display switching process performed by the screen display switching module 135 causes the display to be switched. The display state is returned back to one before the line of sight is diverted.

The display module 190 is connected to the display control module 120. The display module 190 performs display on the display apparatus included in the equipment. For example, the display module 190 displays instructions, states, or the like of the equipment. Specifically, the display module 190 may display secret information, such as a user ID and a password of the operator or an operation history of the operator. The display module 190 switches the display in accordance with the process performed by the screen display switching module 135. For example, the display module 190 switches the display of secret information to one which causes no problems even when other persons watch the display.

Figure 2:
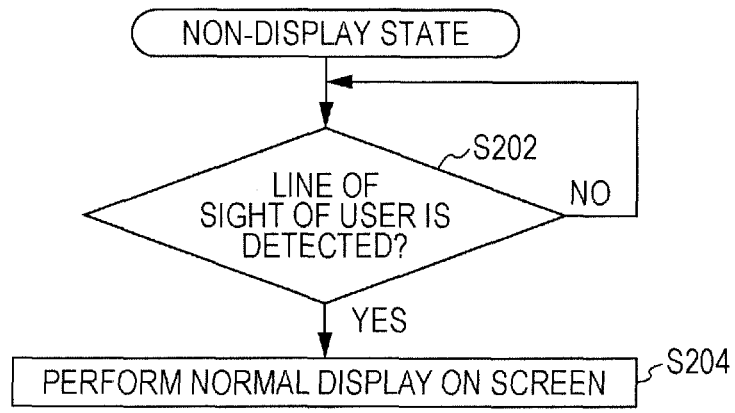
FIG. 2 is a flowchart of an exemplary process performed in an exemplary embodiment.

FIG. 2 is a flowchart of an exemplary process (exemplary second display switching process) performed in the exemplary embodiment.

In step S202, the line-of-sight detection module 125 determines whether or not the line of sight of a user is detected. If the line of sight is detected, the process proceeds to step S204. Otherwise, the screen is kept in the non-display state until the line of sight is detected. The non-display state herein is a state after the first display switching process causes the display to be switched. That is, it is a display state which causes no problems even when other persons watch the display. For example, it is a display such as a screen saver.

In step S204, the screen display switching module 135 performs a normal display on the screen. That is, the display is switched to the original display state before the non-display state. The normal display herein is a display in a state in which the operator is capable of performing operations.

Figure 4A:
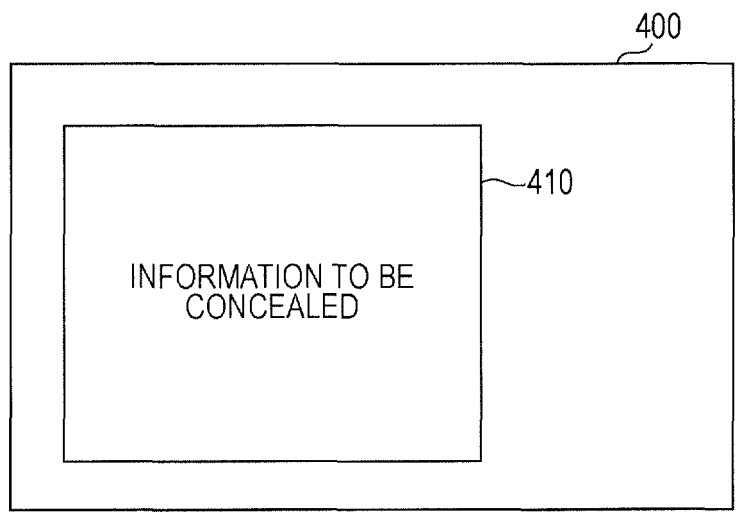
FIGS. 4A and 4B are diagrams for describing an exemplary process performed in an exemplary embodiment.
Figure 4B:
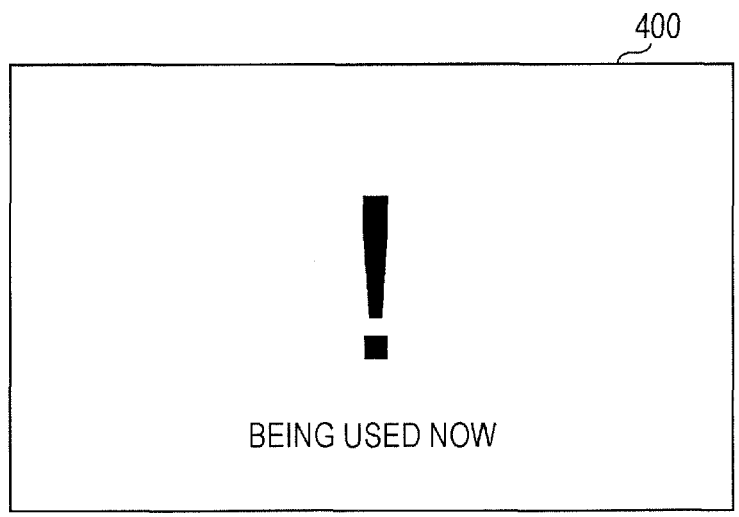

Description will be made by using the example in FIGS. 4A and 4B. The process illustrated in the example in FIG. 2 is one in which the display state is returned back from the state of a screen 400 illustrated in the example in FIG. 4B to the state of the screen 400 illustrated in the example in FIG. 4A. That is, detection of the line of sight causes switching from the display state which causes no problems even when other persons watch the display, as in the screen 400 illustrated in the example in FIG. 4B, to an image including an information display area 410 to be hidden, as in the screen 400 illustrated in the example in FIG. 4A.

Figure 3:
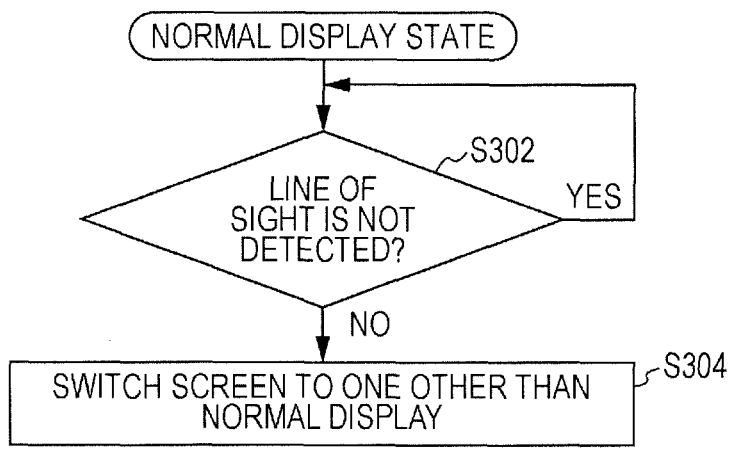
FIG. 3 is a flowchart of an exemplary process performed in an exemplary embodiment.

FIG. 3 is a flowchart of an exemplary process (exemplary first display switching process) performed in the exemplary embodiment. This process starts in the normal display state.

In step S302, the line-of-sight detection module 125 determines whether or not the line of sight is not detected. If the line of sight is not detected, the process proceeds to step S304. Otherwise, the screen is kept in the normal display state until the line of sight is not detected.

In step S304, the screen display switching module 135 switches the screen to one other than the normal display (non-display state in FIG. 2).

Description will be made by using the example in FIGS. 4A and 4B. The process illustrated in the example in FIG. 3 is one in which the state of the screen 400 illustrated in the example in FIG. 4A is switched to the state of the screen 400 illustrated in the example in FIG. 4B.

Figure 5A:
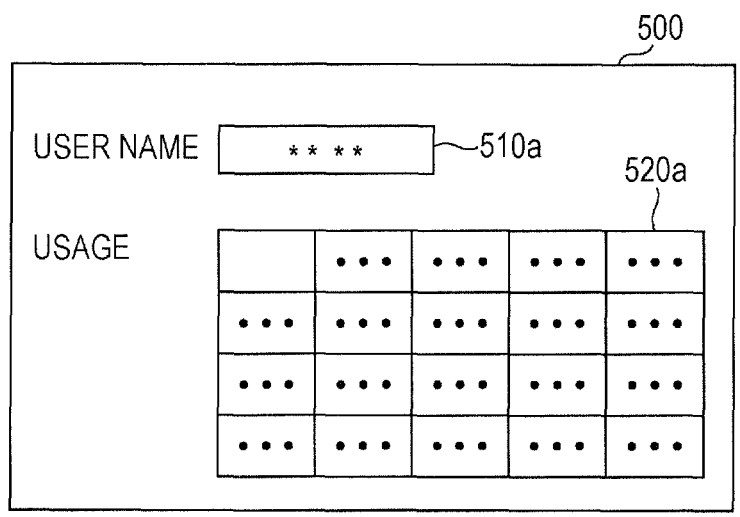
FIGS. 5A and 5B are diagrams for describing an exemplary process performed in an exemplary embodiment.
Figure 5A:
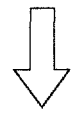
Figure 5B:
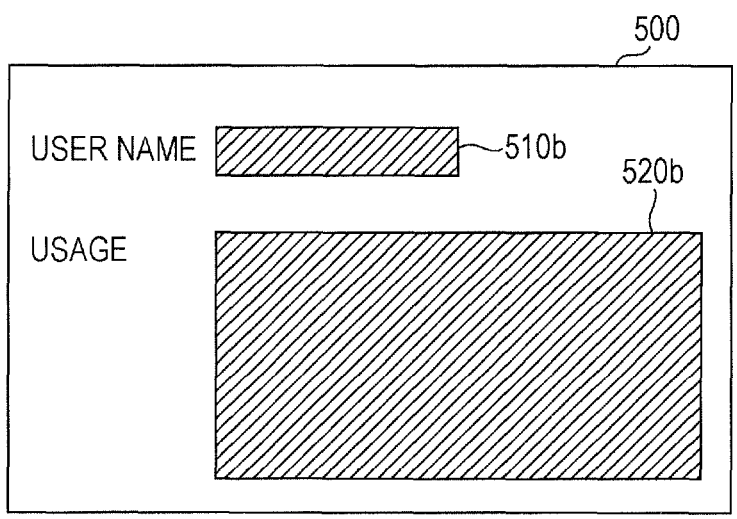

FIGS. 5A and 5B are diagrams for describing the exemplary process performed in the exemplary embodiment. This indicates an example in which the first display switching process is performed to switch the display in a part of the screen. As illustrated in FIG. 5A, when the line of sight is detected, a user name display area 510*a* and a usage display area 520*a* are displayed in a screen 500. These are secret information, and are to be hidden from persons other than the operator. When the line of sight is not detected, as in the example in FIG. 5B, the display is switched to those such as a user name display area 510*b* and a usage display area 520*b*. Specifically, the user name display area 510*a* and the usage display area 520*a* illustrated in the example in FIG. 5A are filled in black. As a matter of course, other than filling of the areas in black, other colors (such as white) may be used to fill the areas; the areas may be filled with mosaic pieces; or an image which causes no problems even when other persons watch the display may be displayed in the areas.

Figure 6:
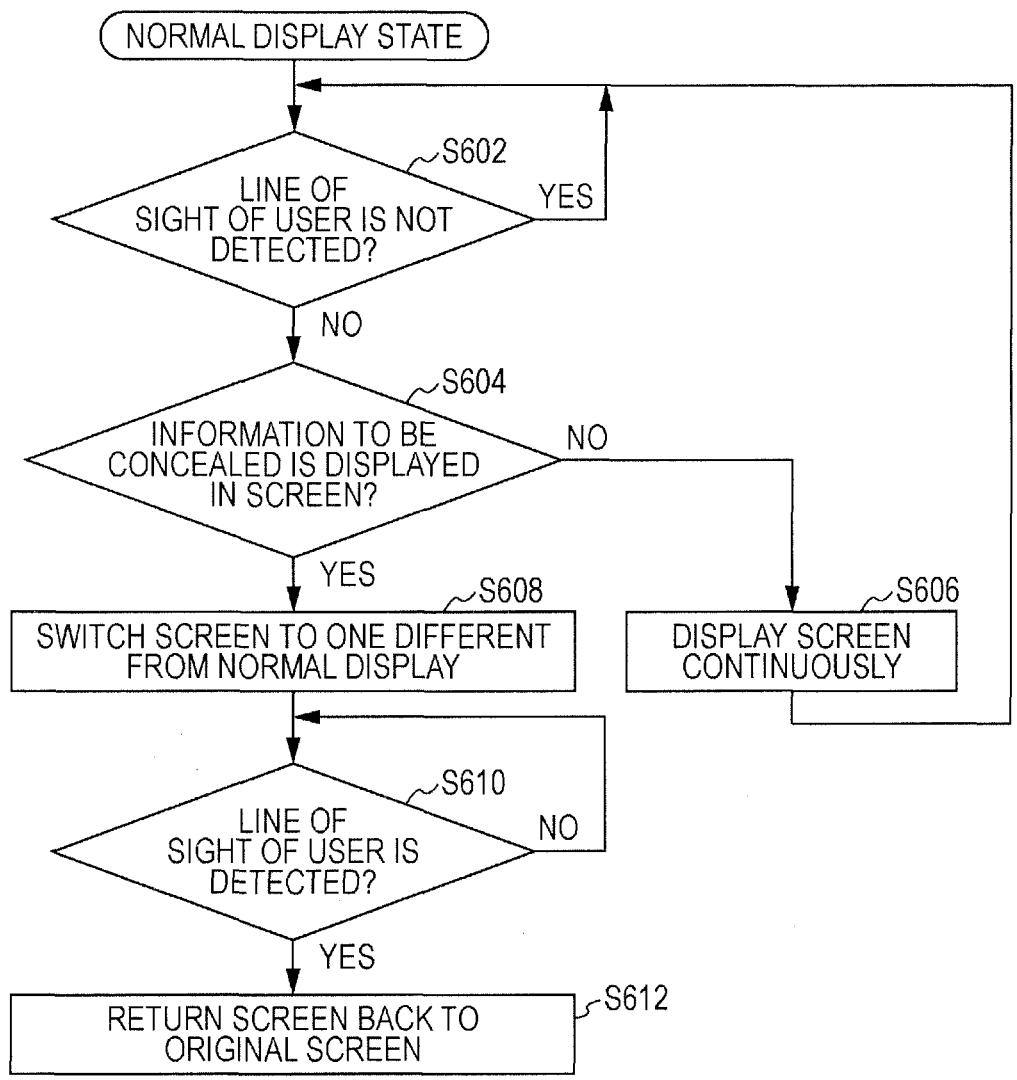
FIG. 6 is a flowchart of an exemplary process performed in an exemplary embodiment.

FIG. 6 is a flowchart of an exemplary process performed in the exemplary embodiment. This process starts in the normal display state.

In step S602, the line-of-sight detection module 125 determines whether or not the line of sight of the user is not detected. If the line of sight is not detected, the process proceeds to step S604. Otherwise, the screen is kept in the normal display state until the line of sight is not detected.

In step S604, the information display determination module 130 determines whether or not information to be concealed is displayed in the screen being displayed. If information to be concealed is displayed, the process proceeds to step S608. Otherwise, the process proceeds to step S606.

The determination as to whether or not information to be concealed is included in the screen will be described in detail by using the examples in FIGS. 9 to 10B.

Figures 9, 10A, 10B:
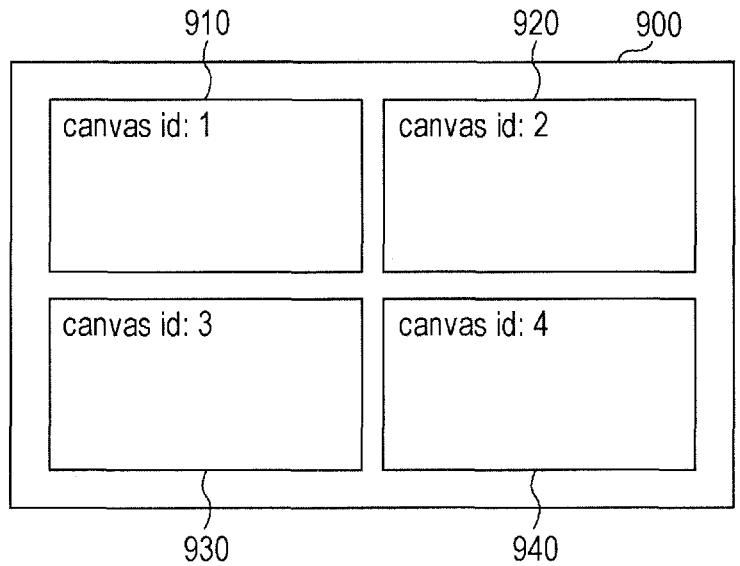
FIG. 9 is a diagram for describing an exemplary process performed in an exemplary embodiment.
FIGS. 10A and 10B are diagrams for describing exemplary data structures for a secret-information attribute of an object.

FIG. 9 is a diagram for describing an exemplary process performed in the exemplary embodiment. Object display areas 910, 920, 930, and 940 are displayed in a screen 900. Information (object ID: identification) for uniquely identifying an object is attached to each object in the exemplary embodiment. Two exemplary data structures which describe whether or not these objects are to be concealed are illustrated.

FIGS. 10A and 10B are diagrams for describing the exemplary data structures for a secret-information attribute of an object. An attribute table for concealment 1000 illustrated in the example in FIG. 10A includes an object ID field 1010 and a secret-information attribute field 1020. The object ID field 1010 stores object IDs. The secret-information attribute field 1020 stores the attribute for each object which indicates whether or not the object is information to be concealed. Therefore, in step S604, data in the secret-information attribute field 1020 may be used to perform the determination. In the example in FIG. 10A, since an object whose object ID is 1 has a secret-information attribute of T, the object is information to be concealed.

In contrast, the example in FIG. 10B illustrates a case in which screen data to be displayed is described by using eXtensible Markup Language (XML). The display screen is constituted by four regions (canvases) as in the example in FIG. 9, and the description in XML is illustrated in FIG. 10B. For each component (object) of the screen, a "secret-information attribute" is described in an object to be concealed. When the secret-information attribute is set to true, the screen data is information to be concealed. Therefore, in step S604, the secret-information attribute in the XML description may be used to perform the determination. In the example in FIG. 10B, since the canvas whose id is 1 has an attribute describing that secret=true, the canvas is information to be concealed.

In step S606, since no information to be concealed is present, the display module 190 continuously displays the screen (i.e., the normal display state), and the process returns back to step S602.

In step S608, the screen display switching module 135 switches the screen to one different from the normal display (first display switching process).

In step S610, the line-of-sight detection module 125 determines whether or not the line of sight of the user is detected. If the line of sight is detected, the process proceeds to step S612. Otherwise, the screen is kept in one different from the normal display until the line of sight is detected.

In step S612, the screen display switching module 135 returns the screen back to the original screen (second display switching process).

Figure 7:
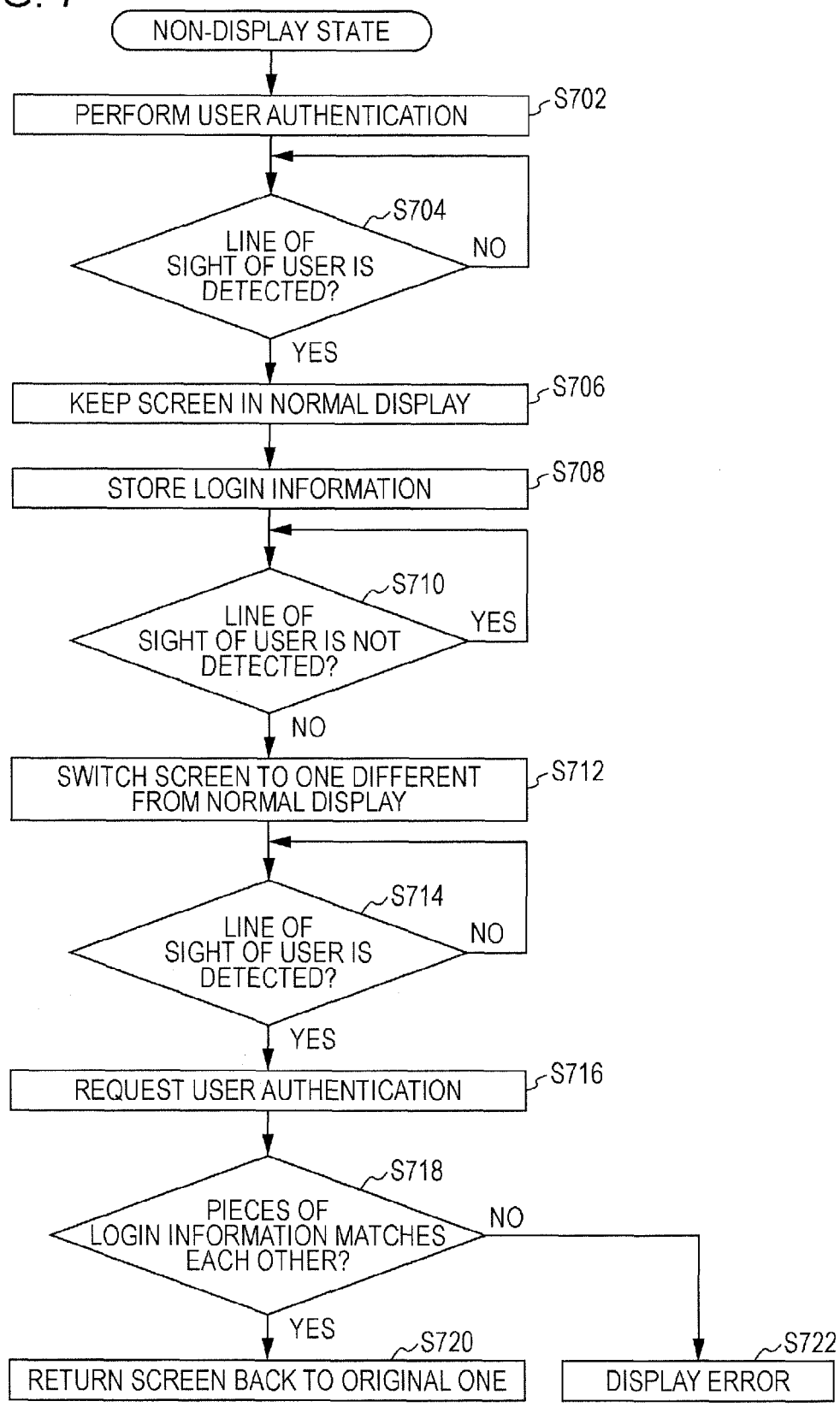
FIG. 7 is a flowchart of an exemplary process performed in an exemplary embodiment.

FIG. 7 is a flowchart of an exemplary process performed in the exemplary embodiment. This process is performed in the case where the information processing apparatus is initially used, that is, where user authentication is necessary.

In step S702, the authentication module 145 performs user authentication. For example, input of a user ID and a password is requested, and whether or not the user ID and the password which are input match those stored in advance is determined.

In step S704, the line-of-sight detection module 125 determines whether or not the line of sight of the user is detected. If the line of sight is detected, the process proceeds to step S706. Otherwise, the screen is kept in the non-display state until the line of sight is detected.

In step S706, the screen display switching module 135 keeps the screen in the normal display.

In step S708, the authentication module 145 stores the login information. Examples of login information include a user ID and a password.

In step S710, the line-of-sight detection module 125 determines whether or not the line of sight of the user is not detected. If the line of sight is not detected, the process proceeds to step S712. Otherwise, the screen is kept in the normal display until the line of sight is not detected, and the original process is continued.

In step S712, the screen display switching module 135 switches the screen to one different from the normal display (first display switching process).

In step S714, the line-of-sight detection module 125 determines whether or not the line of sight of the user is detected. If the line of sight is detected, the process proceeds to step S716. Otherwise, the screen is kept in one different from the normal display until the line of sight is detected.

In step S716, the authentication module 145 requests user authentication. For example, input of a user ID and a password is requested.

In step S718, the authentication module 145 determines whether or not the pieces of login information matches each other. If the pieces of login information matches each other, the process proceeds to step S720. Otherwise, the process proceeds to step S722. The determination here is performed by comparing the login information stored in step S708 (i.e., the login information in the user authentication performed in step S702) with the login information which is input in step S716. For example, the login information is a user ID and a password.

In step S720, the screen display switching module 135 returns the screen back to the original one (second display switching process).

In step S722, the screen display switching module 135 displays an error because the operator after the line of sight is returned back may be different from the operator before the line of sight is diverted.

Figure 8:
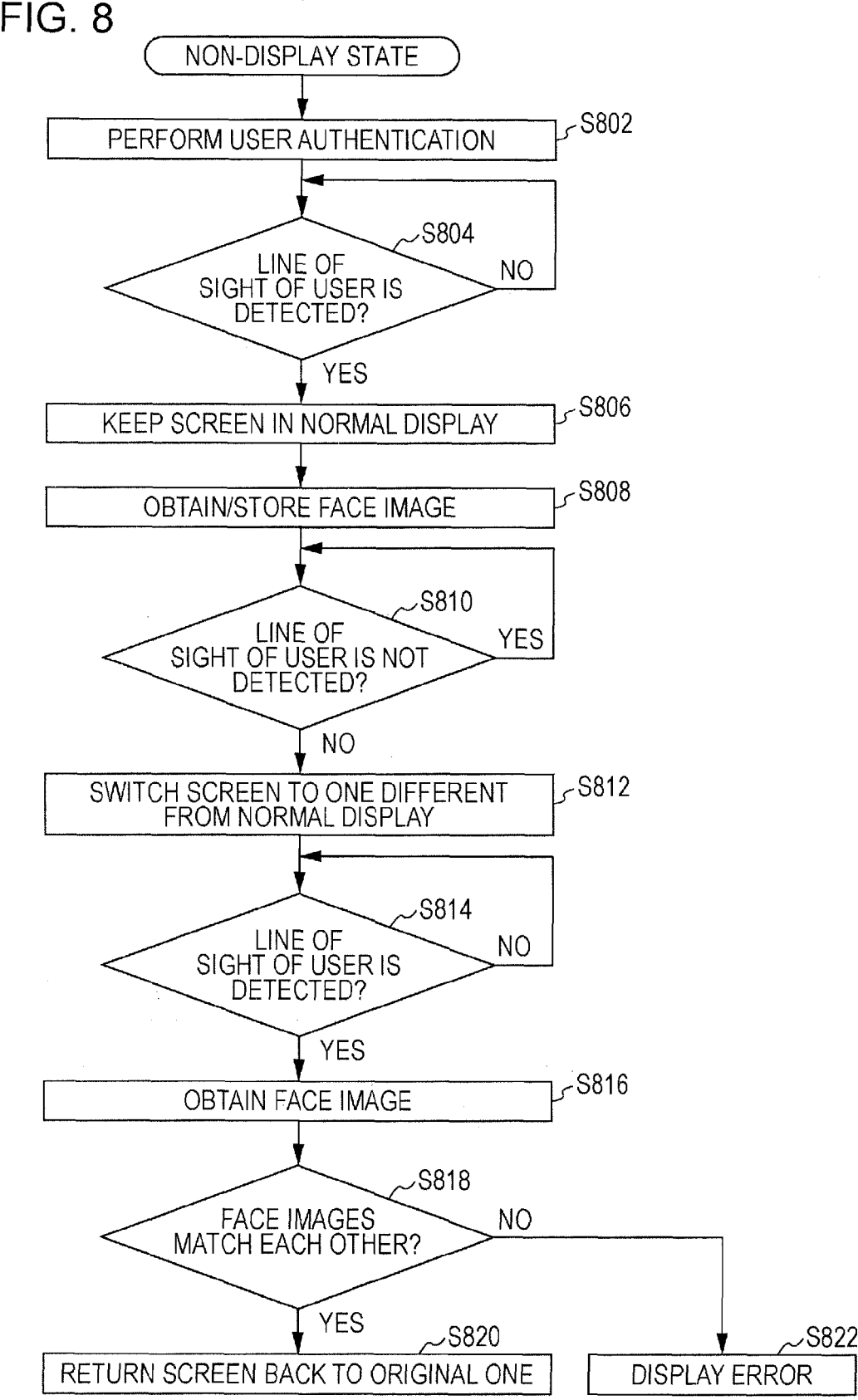
FIG. 8 is a flowchart of an exemplary process performed in an exemplary embodiment.

FIG. 8 is a flowchart of an exemplary process performed in the exemplary embodiment. This process is performed in the case where the information processing apparatus is initially used, that is, where user authentication is necessary.

In step S802, the authentication module 145 performs user authentication.

In step S804, the line-of-sight detection module 125 determines whether or not the line of sight of a user is detected. If the line of sight is detected, the process proceeds to step S806. Otherwise, the screen is kept in the non-display state until the line of sight is detected.

In step S806, the screen display switching module 135 keeps the screen in the normal display.

In step S808, the face recognition module 140 obtains/stores a face image. The face recognition module 140 uses a camera to photograph the operator face in a state in which the user authentication has been just performed and in which the line of sight is detected, and stores the first face image.

In step S810, the line-of-sight detection module 125 determines whether or not the line of sight of the user is not detected. If the line of sight is not detected, the process proceeds to step S812. Otherwise, the screen is kept in the normal display until the line of sight is not detected, and the original process is continued.

In step S812, the screen display switching module 135 switches the screen to one different from the normal display (first display switching process).

In step S814, the line-of-sight detection module 125 determines whether or not the line of sight of the user is detected. If the line of sight is detected, the process proceeds to step S816. Otherwise, the screen is kept in one different from the normal display until the line of sight is detected.

In step S816, the face recognition module 140 obtains a face image. The face recognition module 140 uses the camera to photograph the operator face, and obtains the second face image.

In step S818, the face recognition module 140 determines whether or not the first face image matches the second face image. If the first face image matches the second face image, the process proceeds to step S820. Otherwise, the process proceeds to step S822.

In step S820, the screen display switching module 135 returns the screen back to the original one (second display switching process).

In step S822, the screen display switching module 135 displays an error because the operator after the line of sight is returned back may be different from the operator before the line of sight is diverted.

An exemplary hardware configuration of the information processing apparatus according to the exemplary embodiment will be described with reference to FIG. 11. The configuration illustrated in FIG. 11 is constituted by, for example, a personal computer (PC). The exemplary hardware configuration including a data readout unit 1117 such as a scanner and a data output unit 1118 such as a printer is illustrated.

A CPU 1101 is a controller which performs processing in accordance with computer programs describing execution sequences in various modules described in the above-described exemplary embodiment, i.e., the image receiving module 110, the line-of-sight detection module 125, the information display determination module 130, the screen display switching module 135, the face recognition module 140, the authentication module 145, and the display module 190.

A read only memory (ROM) 1102 stores, for example, programs and computation parameters used by the CPU 1101. A RAM 1103 stores, for example, programs used in the execution performed by the CPU 1101, and parameters which are changed as appropriate in the execution. These are connected to each other via a host bus 1104 constituted by, for example, a CPU bus.

The host bus 1104 is connected to an external bus 1106 such as a peripheral component interconnect/interface (PCI) bus via a bridge 1105.

A keyboard 1108 and a pointing device 1109 such as a mouse are input devices with which an operator operates. A display 1110 is, for example, a liquid-crystal display apparatus or a cathode ray tube (CRT), and displays various types of information as text or image information.

A hard disk drive (HDD) 1111 includes a hard disk therein, and drives the hard disk to record or reproduce information and programs executed by the CPU 1101. In the hard disk, for example, a face image, a display screen, and the attribute table for concealment 1000 are stored. In addition, various computer programs such as various other data processing programs are stored.

A drive 1112 reads out data or programs which are stored in a removable recording medium 1113 mounted therein, such as a magnetic disk, an optical disk, a magneto-optical disk, or a semiconductor memory, and supplies the data or the programs to the RAM 1103 connected via an interface 1107, the external bus 1106, the bridge 1105, and the host bus 1104. The removable recording medium 1113 may be also used as a data recording area similar to the hard disk.

A connection port 1114 is a port for connecting an external connection apparatus 1115, and has a connecting portion that supports, for example, Universal Serial Bus (USB) or IEEE1394. The connection port 1114 is connected to, for example, the CPU 1101 via the interface 1107, the external bus 1106, the bridge 1105, the host bus 1104, and the like. A communication unit 1116 is connected to a communication line, and performs data communication with the outside. The data readout unit 1117 is, for example, a scanner, and reads out a document. The data output unit 1118 is, for example, a printer, and outputs document data.

The hardware configuration of an information processing apparatus illustrated in FIG. 11 is one exemplary configuration. The hardware configuration according to the exemplary embodiment is not limited to that illustrated in FIG. 11, and may be any configuration as long as the configuration enables the modules described in the exemplary embodiment to be executed. For example, some of the modules may be achieved by using dedicated hardware, such as an application specific integrated circuit (ASIC); some of the modules may be present in an external system which is connected via a communication line; or multiple systems illustrated in FIG. 11 may be connected with each other via a communication line so as to cooperate with each other. Further, the modules may be incorporated in, for example, a copier, a facsimile, a scanner, a printer, a multi-function device, an ATM, or a cellular phone.

In the description about the above-described exemplary embodiment, the terms "equal to or more than", "equal to or less than", "more than", and "less than" which are used when comparison is made with a predetermined value may be "more than", "less than", "equal to or more than", and "equal to or less than", respectively, as long as no contradictions occur in the combinations.

The programs described above may be provided through a recording medium which stores the programs, or may be provided through a communication unit. In these cases, for example, the programs described above may be interpreted as an invention of "a computer-readable recording medium that stores programs".

The term "a computer-readable recording medium that stores programs" refers to a computer-readable recording medium that stores programs and that is used for, for example, the installation and execution of the programs and the distribution of the programs.

Examples of the recording medium include a digital versatile disk (DVD) having a format of "DVD-recordable (DVD-R), DVD-rewritable (DVD-RW), DVD-random access memory (DVD-RAM), or the like" which is a standard developed by the DVD forum or having a format of "DVD+recordable (DVD+R), DVD+rewritable (DVD+RW), or the like" which is a standard developed by the DVD+RW alliance, a compact disk (CD) having a format of CD read only memory (CD-ROM), CD recordable (CD-R), CD rewritable (CD-RW), or the like, a Blu-ray® Disk, a magneto-optical disk (MO), a flexible disk (FD), a magnetic tape, a hard disk, a ROM, an electrically erasable programmable ROM (EEPROMR®), a flash memory, a RAM, and a secure digital (SD) memory card.

The above-described programs or some of them may be stored and distributed by recording them on the recording medium. In addition, the programs may be transmitted through communication, for example, by using a transmission media of, for example, a wired network which is used for a local area network (LAN), a metropolitan area network (MAN), a wide area network (WAN), the Internet, an intranet, an extranet, and the like, a wireless communication network, or a combination of these. Instead, the programs may be carried on carrier waves.

The above-described programs may be included in other programs, or may be recorded on a recording medium along with other programs. Instead, the programs may be recorded on multiple recording media by dividing the programs. The programs may be recorded in any format, such as compression or encryption, as long as it is possible to restore the programs.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a line-of-sight detection unit configured to detect a first line of sight of an operator toward a display apparatus and configured to detect a second line of sight of the operator away from the display apparatus;
   a display determination unit configured to determine whether or not secret information to be concealed from a person other than the operator is displayed on the display apparatus; and
   a first display switching unit configured to switch the secret information displayed on the display apparatus to another image in response to the line-of-sight detection unit detecting the second line of sight of the operator away from the display apparatus.

2. The information processing apparatus according to claim 1, further comprising:
   a second display switching unit, after the first display switching unit performs the display switching process, when the line-of-sight detection unit detects a third line of sight toward the display apparatus, configured to switch the display to a display that was being displayed before the display switching process was performed.

3. The information processing apparatus according to claim 1,
   wherein the first display switching unit is configured to switch an area to the another image, the area being determined, by the display determination unit, to be an area in which the secret information is displayed.

4. The information processing apparatus according to claim 2,
   wherein the first display switching unit is configured to switch an area to the another image, the area being determined, by the display determination unit, to be an area in which the secret information is displayed.

5. The information processing apparatus according to claim 2, further comprising:
   a first authentication unit configured to authenticate the operator in accordance with an operation performed by the operator; and
   a second authentication unit configured to authenticate the operator by determining whether or not an operation performed by the operator matches the operation which was performed by the operator when the first authentication unit authenticated the operator, after the first display switching unit performs the display switching process, when the line-of-sight detection unit detects the third line of sight,
   wherein the second display switching unit is configured to switch the display to a display that was being displayed before the first display switching unit performed the display switching process, when the second authentication unit authenticates the operator.

6. The information processing apparatus according to claim 3, further comprising:
   a first authentication unit configured to authenticate the operator in accordance with an operation performed by the operator; and
   a second authentication unit configured to authenticate the operator by determining whether or not an operation performed by the operator matches the operation which was performed by the operator when the first authentication unit authenticated the operator, after the first display switching unit performs the display switching process, when the line-of-sight detection unit detects the second line of sight,
   wherein a second display switching unit is configured to switch the display to a display that was being displayed before the first display switching unit performed the display switching process, when the second authentication unit authenticates the operator.

7. The information processing apparatus according to claim 4, further comprising:
   a first authentication unit configured to authenticate the operator in accordance with an operation performed by the operator; and
   a second authentication unit configured to authenticate the operator by determining whether or not an operation performed by the operator matches the operation which was performed by the operator when the first authentication unit authenticated the operator, after the first display switching unit performs the display switching process, when the line-of-sight detection unit detects the third line of sight,
   wherein the second display switching unit is configured to switch the display to a display that was being displayed before the first display switching unit performed the display switching process, when the second authentication unit authenticates the operator.

8. The information processing apparatus according to claim 2, further comprising:

a first receiving unit configured to receive a face image obtained by photographing a face of the operator;

a second receiving unit configured to receive a face image obtained by photographing the face of the operator, after the first display switching unit performs the display switching process, when the line-of-sight detection unit detects the third line of sight; and a face determination unit configured to determine whether or not the face image received by the first receiving unit matches the face image received by the second receiving unit, wherein the second display switching unit is configured to switch the display to a display that was being displayed before the first display switching unit performed the display switching process, when the face determination unit determines that the face images match each other.

9. The information processing apparatus according to claim 3, further comprising:

a first receiving unit configured to receive a face image obtained by photographing a face of the operator;

a second receiving unit configured to receive a face image obtained by photographing the face of the operator, after the first display switching unit performs the display switching process, when the line-of-sight detection unit detects the third line of sight; and a face determination unit configured to determine whether or not the face image received by the first receiving unit matches the face image received by the second receiving unit, wherein a second display switching unit is configured to switch the display to a display that was being displayed before the first display switching unit performed the display switching process, when the face determination unit determines that the face images match each other.

10. The information processing apparatus according to claim 4, further comprising:

a first receiving unit configured to receive a face image obtained by photographing a face of the operator;

a second receiving unit configured to receive a face image obtained by photographing the face of the operator, after the first display switching unit performs the display switching process, when the line-of-sight detection unit detects the third line of sight; and a face determination unit configured to determine whether or not the face image received by the first receiving unit matches the face image received by the second receiving unit, wherein the second display switching unit is configured to switch the display to a display that was being displayed before the first display switching unit performed the display switching process, when the face determination unit determines that the face images match each other.

11. A non-transitory computer readable medium storing a program causing a computer to execute a process for information processing, the process comprising:

detecting, by a line-of-sight detection unit, a first line of sight of an operator toward a display apparatus and a second line of sight of the operator away from the display apparatus;

determining, by a display determination unit, whether or not secret information comprising information to be concealed from a person other than the operator is displayed on the display apparatus; and switching, by a first display switching unit, information displayed on the display apparatus to another image on the basis of the determination result obtained by the display determination unit in response to the line-of-sight detection unit detecting, the second line of sight away from the display apparatus.

12. An information processing method comprising:

detecting, by a line-of-sight detection unit, a first line of sight of an operator toward a display apparatus and a second line of sight of the operator away from the display apparatus;

determining whether or not secret information comprising information to be concealed from a person other than the operator is displayed on the display apparatus; and switching information displayed on the display apparatus to another image on the basis of the determination result obtained by the display determination unit in response to the line-of-sight detection unit detecting the second line of sight away from the display apparatus.

13. The information processing apparatus according to claim 1, wherein when the determination resulting in the information displayed on the display apparatus is non-secret information and when an operator takes the first line of sight off the display apparatus from the detected line of sight toward the display apparatus, the display apparatus is configured to continuously display the information displayed on the display apparatus.

14. The non-transitory computer readable medium according to claim 11, wherein when the determining resulting in the information displayed on the display apparatus is non-secret information and when an operator takes the first line of sight off the display apparatus from the detected line of sight toward the display apparatus, continuously displaying the information displayed on the display apparatus.

15. The information processing method according to claim 12, wherein when the determining resulting in the information displayed on the display apparatus is non-secret information and when an operator takes the first line of sight off the display apparatus from the detected line of sight toward the display apparatus, continuously displaying the information displayed on the display apparatus.

16. The information processing apparatus according to claim 1, wherein the first display switching unit configured to switch an entire screen including the secret information displayed on the display apparatus to another image different from the secret information in response to the line-of-sight detection unit detecting the second line of sight of the operator away from the display apparatus.

17. The non-transitory computer readable medium according to claim 11, wherein the switching comprises switching, by the first display switching unit, entire screen including the information displayed on the display apparatus to another image different from the information displayed on the display apparatus on the basis of the determination result obtained by the display determination unit in response to the line-of-sight detection unit detecting, the second line of sight away from the display apparatus.

18. The information processing method according to claim 12, wherein the switching comprises switching an entire image including the information displayed on the display apparatus to another image different from the displayed information on the basis of the determination result obtained by the display determination unit in response to the line-of-sight detection unit detecting the second line of sight away from the display apparatus.

* * * * *